United States Patent
Doucet et al.

(10) Patent No.: US 11,680,196 B2
(45) Date of Patent: *Jun. 20, 2023

(54) USE OF BIODEGRADABLE HYDROCARBON FLUIDS AS HEAT-TRANSFER MEDIA

(71) Applicant: TOTAL MARKETING SERVICES, Puteaux (FR)

(72) Inventors: Clarisse Doucet, Levallois Perret (FR); Laurent Germanaud, Valencin (FR)

(73) Assignee: TOTAL MARKETING SERVICES, Puteaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/344,885

(22) PCT Filed: Oct. 26, 2017

(86) PCT No.: PCT/EP2017/077456
§ 371 (c)(1),
(2) Date: Apr. 25, 2019

(87) PCT Pub. No.: WO2018/078021
PCT Pub. Date: May 3, 2018

(65) Prior Publication Data
US 2020/0048522 A1 Feb. 13, 2020

(30) Foreign Application Priority Data
Oct. 27, 2016 (EP) ..................... 16196115

(51) Int. Cl.
C09K 5/10 (2006.01)
C09K 5/04 (2006.01)

(52) U.S. Cl.
CPC ............... C09K 5/10 (2013.01); C09K 5/048 (2013.01)

(58) Field of Classification Search
CPC .......... C09K 5/04; C09K 5/041; C09K 5/042; C09K 5/048; C09K 5/10; C09K 5/12; C10G 3/50; C10G 45/00; C10G 2300/1011; C10G 2300/1014; C10G 2300/1018; C10G 2300/1022; C10G 2300/1048; C10G 2300/1051; C10G 2300/1055; C10G 2300/1059; C10G 2300/1081; C10G 2300/301; H01B 3/18; H01B 3/20; H01B 3/22; F01M 9/12; F01P 2003/003; F01P 2003/006; B60K 11/00; B60K 11/02; B60K 11/04
USPC ........................................ 252/67, 68, 71, 73
See application file for complete search history.

(56) References Cited

U.S. PATENT DOCUMENTS

| | | | |
|---|---|---|---|
| 4,125,566 A | 11/1978 | Trin Dinh et al. | |
| 4,385,193 A | 5/1983 | Bijwaard et al. | |
| 4,440,152 A * | 4/1984 | Leflar | F24S 70/30 126/584 |
| 4,478,955 A | 10/1984 | Pesa et al. | |
| 4,594,468 A | 6/1986 | Minderhoud et al. | |
| 4,943,672 A | 7/1990 | Hamner et al. | |
| 5,059,299 A | 10/1991 | Cody et al. | |
| 6,090,989 A | 7/2000 | Trewella et al. | |
| 6,130,184 A | 10/2000 | Geerlings et al. | |
| 7,252,753 B2 * | 8/2007 | Rosenbaum | H01B 3/22 208/14 |
| 7,862,743 B2 * | 1/2011 | Shah | C10M 169/04 252/73 |
| 8,201,409 B1 * | 6/2012 | Zakiewicz | F24T 10/10 60/641.2 |
| 8,544,282 B2 * | 10/2013 | Wyer | F24T 10/10 62/77 |
| 8,608,812 B2 | 12/2013 | Perego et al. | |
| 9,260,946 B2 * | 2/2016 | Sneisen | E21B 41/0007 |
| 9,469,583 B2 * | 10/2016 | Aalto | C09D 7/20 |
| 9,845,432 B2 | 12/2017 | Rispoli et al. | |
| 2005/0258261 A1 * | 11/2005 | Gast | F24S 40/40 237/2 A |
| 2006/0264684 A1 | 11/2006 | Petri et al. | |
| 2007/0151526 A1 * | 7/2007 | Colbourne | C10M 107/02 123/1 A |
| 2009/0001330 A1 * | 1/2009 | Arickx | H01B 3/22 252/574 |
| 2009/0209793 A1 * | 8/2009 | Selby | C10L 10/02 585/1 |
| 2015/0191404 A1 * | 7/2015 | Aalto | C10G 45/58 585/16 |

(Continued)

FOREIGN PATENT DOCUMENTS

| | | |
|---|---|---|
| EP | 0583836 | 2/1994 |
| EP | 0668342 | 8/1995 |

(Continued)

OTHER PUBLICATIONS

Ratiu ("The History of the Internal Combustion Engine" Annals of the Faculty of Engineering Hunedoara, Tome I, Fascicole 3, 2003) (Year: 2003).*
Ogden et al. ("Societal lifecycle costs of cars with alternative fuels/engines" Energy Policy 32, 2004, pp. 7-27) (Year: 2004).*

*Primary Examiner* — Matthew R Diaz

(74) *Attorney, Agent, or Firm* — Duane Morris LLP; Gregory M. Lefkowitz; Brandon A. Chan

(57) ABSTRACT

The invention relates to the use, as a liquid phase heat-transfer medium, of a fluid having a boiling point in the range of from 200° C. to 400° C. and a boiling range below 80° C., said fluid comprising more than 95% by weight isoparaffins and less than 3% by weight of naphthens, a biocarbon content of at least 95% by weight, containing less than 100 ppm by weight aromatics.

16 Claims, No Drawings

(56) References Cited

U.S. PATENT DOCUMENTS

| | | | | |
|---|---|---|---|---|
| 2015/0364229 A1* | 12/2015 | Singha | ..................... | H01B 3/22 |
| | | | | 174/30 |
| 2016/0230109 A1* | 8/2016 | Wiersma | ................... | C10L 1/04 |
| 2017/0009119 A1* | 1/2017 | Hahn | ..................... | H01F 27/105 |

FOREIGN PATENT DOCUMENTS

| | | | | |
|---|---|---|---|---|
| EP | 0776959 | | 6/1997 | |
| EP | 1050569 A1 * | 11/2000 | ............... | C09K 5/10 |
| EP | 2368967 | | 9/2011 | |
| EP | 2368967 A1 * | 9/2011 | ............... | C10G 3/50 |
| WO | WO-2015044289 A1 * | 4/2015 | .......... | C10M 107/02 |

* cited by examiner

USE OF BIODEGRADABLE HYDROCARBON FLUIDS AS HEAT-TRANSFER MEDIA

CROSS-REFERENCE TO RELATED APPLICATIONS

This application is a § 371 national stage entry of International Application No. PCT/EP2017/077456, filed Oct. 26, 2017, which claims priority to European Application No. 16196115.6, filed Oct. 27, 2016, the entire contents of which are incorporated herein by reference.

FIELD OF THE INVENTION

The invention relates to the use of specific biodegradable fluids as heat-transfer media. The fluids as used in the invention, hereinafter referred to as being improved fluids, have a narrow boiling range and a very low aromatic content, and exhibit valuable properties making them especially suited for use as heat-transfer media, incl. as heat-transfer fluid and coolant.

BACKGROUND ART

Hydrocarbon fluids find widespread use, including use as heat-transfer fluid. Heat-transfer fluids can be used as liquid or liquid/gas fluids, the latter case involving a physical state change.

For example, liquid phase heat-transfer media operate over the broad temperature range of −115° C. to 400° C., and are designed to be used in non-pressurized systems and low to medium-pressurized systems. A major advantage of liquid heat transfer is lower cost installation and operation. Capital cost is reduced by elimination of large diameter piping, safety valves, steam traps and water treatment facilities. Operating cost is reduced by low maintenance requirements and reduced makeup. Liquid/vapor phase heat-transfer fluids also exist. They offer a broad operating temperature range and uniform heat transfer. Other major benefits include precise temperature control and low mechanical maintenance costs. Also, a heat transfer system that utilizes a vapor phase medium usually requires less fluid than a comparable liquid phase system because the equipment fills with vapor instead of liquid.

Hence, there exist a number of different types of heat-transfer fluids, liquid or liquid/vapor, that can be used in non-pressurized or pressurized equipments.

Also, the temperature range of operation is selected according to the end-use. For example end-uses include stationary heat-exchangers, off-road heat-exchangers, with or without primary and secondary circuits, with or without radiators, pumps, chillers, heaters, coolers, temperature control units, injection units, LBG units, CSP plants, and the like. Generally, heat-transfer media find application as heat-transfer fluids (i.e. in the industry) and as a coolant (i.e. in a car engine or the like).

Heat-transfer media are also classified according to the temperature range. For example, it is widely recognized that the heat transfer media can be classified as follows
- Very Low Temperature, −115° C. to 175° C. (e.g. applications in pharmaceutical manufacturing, environmental test chambers),
- Low Temperature, −50° C. to 220° C. (e.g. applications in HVAC, pharmaceutical manufacturing, synthetic fiber manufacturing, food and beverage, environmental test chambers),
- Medium Temperature, −30° C. to 315° C. (e.g. applications in oil and gas processing, chemical industries, plastics processing, biodiesel manufacturing, natural gas purification),
- High Temperature, −20° C. to 350° C. (e.g. application in oil and gas processing, chemical industries, plastics processing, biodiesel manufacturing, solar energy, gas-to-liquid, plastic moulding),
- Ultra High Temperature, −10° C. to 400° C. (e.g. application in concentrated solar power (CSP), biodiesel production, chemical industries, gas-to-liquid, refining asphalt).

There exist a great number of players that provide heat transfer media. However, known heat transfer media so far are especially mineral oils, such as alkylated-aromatic fluids.

Companies Nesté Oy and Avantherm have announced their cooperation for the manufacturing of cooling medium. According to the press release of Apr. 28, 2016, "Neste Renewable Isoalkane to be used for Avantherm's renewable products for transferring heat and cold". The product used is the Neste Renewable Isoalkane which is used thanks to the company's proprietary NEXBTL technology. However this product is not appropriate given especially its flash point.

Document WO 2015/044289 discloses a Fischer-Tropsch derived gas oil fraction that can be used in solvent and functional fluid applications. Said document does not disclose a fluid having the defined biocarbon content. Additionally, said document does not disclose the use of the fluid as a liquid phase heat-transfer medium, such as a heat-transfer fluid or a coolant.

Document EP 2 368 967 discloses a solvent composition comprising 5 to 30% by weight of C10-C20 normal alkanes and 70 to 95% by weight of C10-C20 iso-alkanes, produced from raw materials of biological origin. Said document does not disclose the specific use of the fluid specifically defined in the invention.

There remains a need for a heat-transfer medium that would be from biologic origin and not fossil, would be biodegradable yet exhibit improved properties useful for heat-transfer, notably would exhibit appropriate viscosities, heat transfer capacity and the correct operating range.

SUMMARY OF THE INVENTION

The invention provides the use, as a liquid phase heat-transfer medium, of a fluid having a boiling point in the range of from 200° C. to 400° C. and a boiling range below 80° C., said fluid comprising more than 95% by weight isoparaffins and less than 3% by weight of naphthens, a biocarbon content of at least 95% by weight, containing less than 100 ppm by weight aromatics.

As well understood by the skilled person, a boiling range below 80° C. means that the difference between the final boiling point and the initial boiling point is less than 80° C.

According to one embodiment, the heat-transfer medium is used as a heat-transfer fluid or as a coolant, preferably as a coolant for a vehicle engine, more preferably car engine.

According to one embodiment, the heat-transfer medium is used in a closed-loop system, preferably non-pressurized.

According to one embodiment, the fluid has a boiling point in the range of from 220° C. to 340° C., preferably 240° C. to 340° C. and more preferably 250° C. to 340° C.

According to one embodiment, the boiling range is 240° C.-275° C. or 250° C.-295° C. or 285° C.-335° C.

According to one embodiment, the operating temperature range is −50° C. to 260° C., preferably −50° C. to 220° C.

Preferably for this embodiment, the fluid has a boiling range of 240° C.-275° C. or a boiling range of 250° C.-295° C.

According to another embodiment, the operating temperature range is −30° C. to 315° C. Preferably for this embodiment, the fluid has a boiling range of 285° C.-335° C.

According to one embodiment, the fluid is obtainable by the process comprising the step of catalytically hydrogenating a feed comprising more than 95% by weight of a hydrodeoxygenated isomerized hydrocarbon biomass feedstock or a feed comprising more than 95% by weight of a feedstock originating from syngas, at a temperature from 80 to 180° C., at a pressure from 50 to 160 bars, a liquid hourly space velocity of 0.2 to 5 hr$^{-1}$ and a hydrogen treat rate up to 200 Nm$^3$/ton of feed; preferably the feed comprises more than 98%, preferably more than 99% of a hydrodeoxygenated isomerized hydrocarbon biomass feedstock, and more preferably consists of a hydrodeoxygenated isomerized hydrocarbon biomass feedstock, and especially where the biomass is a vegetable oil, an ester thereof or a triglyceride thereof, the feed being more preferably a hydrotreated vegetable oil (HVO) feed, especially NEXBTL, or wherein the feed comprises more than 98%, preferably more than 99% of a feedstock originating from syngas, more preferably from renewable syngas.

According to one variant, in the previous embodiment, a fractionating step is carried out before the hydrogenating step, or after the hydrogenating step or both.

According to one embodiment, the fluid contains less than 50 ppm by weight aromatics, and preferably less than 20 ppm by weight.

According to one embodiment, the fluid contains less than 1% by weight of naphthens, preferably less than 500 ppm and advantageously less than 50 ppm.

According to one embodiment, the fluid contains less than 5 ppm, even less than 3 ppm and preferably less than 0.5 ppm sulphur.

According to one embodiment, the fluid has a biodegradability at 28 days of at least 60%, preferably at least 70%, more preferably at least 75% and advantageously at least 80%, as measured according to the OECD 306 standard.

The improved fluids will thus find applications in a number of applications, especially those involving a closed loop system, preferably non-pressurized. The fluids may also find applications in pressurized (low to medium) closed loop systems as well as in open loop systems. The improved fluids may thus be used in a number of applications such as pharmaceutical manufacturing, synthetic fiber manufacturing, food and beverage, environmental test chambers, applications in oil and gas processing, chemical industries, plastics processing, biodiesel manufacturing, natural gas purification.

The improved fluids as heat-transfer media find application as heat-transfer fluids (i.e. in the industry) and as a coolant (i.e. in a car engine or the like), the latter being a preferred application of the present improved fluids.

In use, the improved fluids of the invention can also comprise any additive known in the art.

It is also possible to use mixtures of the improved fluids of the invention with other fluids, either as the starting heat-transfer media or when refilling existing installations. The invention also applies to the use of the present fluids of the invention for replacing part or all existing heat-transfer media.

DESCRIPTION OF EMBODIMENTS OF THE INVENTION

Process for Manufacturing the Improved Fluids Used in the Invention.

The invention makes use of an improved fluid having a boiling point in the range of from 200 to 400° C. and comprising more than 95% isoparaffins and containing less than 100 ppm aromatics by weight, obtainable by the process comprising the step of catalytically hydrogenating a feed comprising more than 95% by weight of a hydrodeoxygenated isomerized hydrocarbon biomass feedstock or a feed comprising more than 95% by weight of a feedstock originating from syngas, at a temperature from 80 to 180° C., at a pressure from 50 to 160 bars, a liquid hourly space velocity of 0.2 to 5 hr$^{-1}$ and an hydrogen treat rate up to 200 Nm$^3$/ton of feed.

According to a first variant, the feed comprises more than 98%, preferably more than 99% of a hydrodeoxygenated isomerized hydrocarbon biomass feedstock, and more preferably consists of a hydrodeoxygenated isomerized hydrocarbon biomass feedstock. According to an embodiment, the biomass is a vegetable oil, an ester thereof or a triglyceride thereof. According to an embodiment, the feed is a NEXBTL feed.

According to second variant, the feed comprises more than 98%, preferably more than 99% of a feedstock originating from syngas. According to an embodiment, the feedstock originates from renewable syngas.

According to an embodiment, the hydrogenation conditions of the process are the following:

Pressure: 80 to 150 bars, and preferably 90 to 120 bars;
Temperature: 120 to 160° C. and preferably 150 to 160° C.;
Liquid hourly space velocity (LHSV): 0.4 to 3, and preferably 0.5 to 0.8 hr$^{-1}$;
Hydrogen treat rate be up to 200 Nm$^3$/ton of feed.

According to an embodiment, a fractionating step is carried out before the hydrogenating step, or after the hydrogenating step or both; according to an embodiment, the process comprises three hydrogenation stages, preferably in three separate reactors.

The invention thus discloses fluids having a boiling point in the range of from 200 to 400° C. and a boiling range below 80° C., said fluid comprising more than 95% by weight isoparaffins and less than 3% by weight of naphthens, a biodegradability at 28 days of at least 60%, as measured according to the OECD 306 standard, a biocarbon content of at least 95% by weight, containing less than 100 ppm aromatics by weight, and preferably comprising carbon expressed as $CH_3$ sat less than 30%.

According to an embodiment, the fluid has a boiling point in the range 220 to 340° C. and advantageously more than 240° C. and up to 340° C.

The boiling point can be measured according to well-known methods for the skilled person. As an example, the boiling point can be measured according to ASTM D86 standard.

According to an embodiment, the fluid has a boiling range below 80° C., preferably below 60° C., more preferably between 35 and 50° C. and advantageously between 40 and 50° C.

According to an embodiment, the fluid contains less than 50 ppm aromatics, and preferably less than 20 ppm by weight.

According to an embodiment, the fluid contains less than 1% by weight of naphthens, preferably less than 500 ppm and advantageously less than 50 ppm.

According to an embodiment, the fluid contains less than 5 ppm, even less than 3 ppm and preferably less than 0.5 ppm sulphur.

According to an embodiment, the fluid comprises more than 98% by weight isoparaffins.

According to an embodiment, the fluid comprises less than 5% by weight of n-paraffins, preferably less than 3% by weight of n-paraffins.

According to an embodiment, the fluid has a ratio of iso-paraffins to n-paraffins of at least 20:1.

According to an embodiment, the fluid comprises more than 95% by weight of molecules with from 14 to 18 carbon atoms as isoparaffins, preferably comprises by weight, from 60 to 95%, more preferably 80 to 98%, of isoparaffins selected from the group consisting of C15 isoparaffins, C16 isoparaffins, C17 isoparaffins, C18 isoparaffins and mixtures of two or more thereof.

According to an embodiment, the fluid comprises:
C15 isoparaffins and C16 isoparaffins in a combined amount of 80 to 98%; or
C16 isoparaffins, C17 isoparaffins and C18 isoparaffins in a combined amount of 80 to 98%; or
C17 isoparaffins and C18 isoparaffins in a combined amount of 80 to 98%.

According to an embodiment, the fluid exhibits one or more, preferably all of the following features:
the fluid comprises carbon expressed as Cquat less than 3%, preferably less than 1% and more preferably about 0%;
the fluid comprises carbon expressed as CH sat less than 20%, preferably less than 18% and more preferably less than 15%;
the fluid comprises carbon expressed as $CH_2$ sat more than 40%, preferably more than 50% and more preferably more than 60%;
the fluid comprises carbon expressed as $CH_3$ sat less than 30%, preferably less than 28% and more preferably less than 25%;
the fluid comprises carbon expressed as $CH_3$ long chain less than 20%, preferably less than 18% and more preferably less than 15%;
the fluid comprises carbon expressed as $CH_3$ short chain less than 15%, preferably less than 10% and more preferably less than 9%.

The amount of isoparaffins, naphthens and/or aromatics can be determined according to any known methods for the skilled person. Among those methods, mention may be made of gas chromatography.

According to an embodiment, the fluid has a biodegradability at 28 days of at least 60%, preferably at least 70%, more preferably at least 75% and advantageously at least 80%, as measured according to the OECD 306 standard.

According to an embodiment, the fluid has a biocarbon content of at least 95% by weight, preferably at least 97%, more preferably at least 98%, and even more preferably about 100%.

The feedstock will first be disclosed, then the hydrogenation step and the associated fractionating step, and finally the improved fluids.

Feedstock.

The feedstock or simply feed may, according to a first variant, be a feed which is the result of a process of hydrodeoxygenation followed by isomerization, hereafter "HDO/ISO", as practiced on a biomass.

This HDO/ISO process is applied on biological raw materials, the biomass, selected from the group consisting of vegetable oils, animal fats, fish oils, and mixtures thereof, preferably vegetable oils. Suitable vegetable raw materials include rapeseed oil, canola oil, colza oil, tall oil, sunflower oil, soybean oil, hemp oil, olive oil, linenseed oil, mustard oil, palm oil, arachis oil, castor oil, coconut oil, animal fats such as suet, tallow, blubber, recycled alimentary fats, starting materials produced by genetic engineering, and biological starting materials produced by microbes such as algae and bacteria. Condensation products, esters, or other derivatives obtained from biological raw materials may also be used as starting materials, as well as recycled oils such as Used Fired Methyl Ester Oils (UFOME). An especially preferred vegetable raw material is an ester or triglyceride derivative. This material is submitted to an hydrodeoxygenation (HDO) step for decomposing the structure of the biological ester or triglyceride constituent, and for removing oxygen, phosphorus and sulfur (part of) compounds, concurrently hydrogenating the olefinic bonds, followed by isomerization of the product thus obtained, thus branching the hydrocarbon chain and improving the low temperature properties of the thus-obtained feedstock.

In the HDO step, hydrogen gas and the biological constituent are passed to the HDO catalyst bed either in countercurrent or concurrent manner. In the HDO step, the pressure and the temperature range typically between 20 and 150 bar, and between 200 and 500° C., respectively. In the HDO step, known hydrodeoxygenation catalysts may be used. Prior to the HDO step, the biological raw material may optionally be subjected to prehydrogenation under milder conditions to avoid side reactions of the double bonds. After the HDO step, the product is passed to the isomerization step where hydrogen gas and the biological constituent to be hydrogenated, and optionally a n-paraffin mixture, are passed to the isomerization catalyst bed either in concurrent or countercurrent manner. In the isomerization step, the pressure and the temperature range between typically 20 and 150 bar, and between 200 and 500° C., respectively. In the isomerization step, isomerization catalysts known as such may be typically used.

Secondary process steps can also be present (such as intermediate pooling, scavenging traps, and the like).

The product issued from the HDO/ISO steps may for instance be fractionated to give the desired fractions.

Various HDO/ISO processes are disclosed in the literature. WO2014/033762 discloses a process which comprises a pre-hydrogenation step, a hydrodeoxygenation step (HDO) and an isomerization step which operates using the countercurrent flow principle. EP1728844 describes a process for the production of hydrocarbon components from mixtures of a vegetable or animal origin. The process comprises a pretreatment step of the mixture of a vegetable origin for removing contaminants, such as, for example, alkaline metal salts, followed by a hydrodeoxygenation (HDO) step and an isomerization step. EP2084245 describes a process for the production of a hydrocarbon mixture that can be used as diesel fuel or diesel component by the hydrodeoxygenation of a mixture of a biological origin containing fatty acid esters possibly with aliquots of free fatty acids, such as for example vegetable oils such as sunflower oil, rape oil, canola oil, palm oil, or fatty oils contained in the pulp of pine trees (tall oil), followed by hydroisomerization on specific catalysts. EP2368967 discloses such a process and the thus-obtained product.

Company Nesté Oy has developed specific HDO/ISO processes, and is currently marketing products thus obtained, under the tradename NexBTL● (diesel, aviation fuel, naphtha, isoalkane). This NexBT● is an appropriate feed for use in the present invention. The NEXBTL feed is further described at at the neste oy website.

The feedstock or simply feed may, according a second variant, be a feed which is the result of a process of conversion of syngas into hydrocarbons suitable for further processing as a feedstock. Syngas typically comprises hydrogen and carbon monoxide and possibly minor other components, like carbon dioxide. A preferred syngas used in the invention is renewable syngas, i.e. syngas from renewable sources (incl. renewable energy sources as detailed below).

Representative of possible syngas-based feedstocks are the Gas to liquids (GTL) feedstock, the Biomass to liquids (BTL) feedstock, the renewable Methanol to liquid (MTL) feedstock, renewable steam reforming, and waste-to-energy gasification, as well as more recent methods using renewable energy (solar energy, wind energy) to convert carbon dioxide and hydrogen into syngas. An example of this later process is the audi● e-diesel feedstock process. The term syngas also extends to any source of material that can be used in a Fischer Tropsch process, such as methane-rich gases (which may use syngas as intermediate).

The syngas to liquids (STL) process is a refinery process that converts gaseous hydrocarbons into longer-chain hydrocarbons such as gasoline or diesel fuel. Renewable methane-rich gases are converted into liquid synthetic fuels either via direct conversion or via syngas as an intermediate, for example using the Fischer Tropsch process, Methanol to Gasoline process (MTG) or Syngas to gasoline plus process (STG+). For the Fischer Tropsch process, the effluents produced are Fischer-Tropsch derived.

By "Fischer-Tropsch derived" is meant that a hydrocarbon composition is, or derives from, a synthesis product of a Fischer-Tropsch condensation process. The Fischer-Tropsch reaction converts carbon monoxide and hydrogen (syngas) into longer chain, usually paraffinic hydrocarbons. The overall reaction equation is straightforward (but hides mechanistic complexity):

$$n(CO+2H_2) = (-CH_2-)_n + nH_2O + \text{heat},$$

in the presence of an appropriate catalyst and typically at elevated temperatures (e.g., 125 to 300° C., preferably 175 to 250° C.). and/or pressures (e.g., 5 to 100 bars, preferably 12 to 50 bars). Hydrogen: carbon monoxide ratios other than 2:1 may be employed if desired. The carbon monoxide and hydrogen may themselves be derived from organic or inorganic, natural or synthetic sources, typically either from natural gas or from organically derived methane. For examples it can also be derived from biomass or from coal.

The collected hydrocarbon composition containing a continuous iso-paraffinic series as described above may preferably be obtained by hydroisomerisation of a paraffinic wax, preferably followed by dewaxing, such as solvent or catalytic dewaxing. The paraffinic wax is preferably a Fischer-Tropsch derived wax.

Hydrocarbon cuts may be obtained directly from the Fischer-Tropsch reaction, or indirectly for instance by fractionation of Fischer-Tropsch synthesis products or preferably from hydrotreated Fischer-Tropsch synthesis products. Hydrotreatment preferably involves hydrocracking to adjust the boiling range (see, e.g., GB-B-2077289 and EP-A-0147873) and/or hydroisomerisation, which can improve cold flow properties by increasing the proportion of branched paraffins. EP-A-0583836 describes a two-step hydrotreatment process in which a Fischer-Tropsch synthesis product is firstly subjected to hydroconversion under conditions such that it undergoes substantially no isomerisation or hydrocracking (this hydrogenates the olefinic and oxygen-containing components), and then at least part of the resultant product is hydroconverted under conditions such that hydrocracking and isomerisation occur to yield a substantially paraffinic hydrocarbon fuel. It is possible to adjust the isomerization process so as to obtain mainly isoparaffins with the required carbon distribution. The syngas-based feedstock is isoparaffinic in nature as it contains more than 90% isoparaffins.

Other post-synthesis treatments, such as polymerisation, alkylation, distillation, cracking-decarboxylation, isomerisation and hydroreforming, may be employed to modify the properties of Fischer-Tropsch condensation products, as described for instance in U.S. Pat. Nos. 4,125,566 and 4,478,955. Examples of Fischer-Tropsch processes which for example can be used to prepare the above-described Fischer-Tropsch derived collected hydrocarbon composition are the so-called commercial Slurry Phase Distillate technology of Sasol, the Shell Middle Distillate Synthesis Process and the "AGC-21" Exxon Mobil process. These and other processes are for example described in more details in EP-A-776959, EP-A-668342, U.S. Pat. Nos. 4,943,672, 5,059,299, WO-A-9934917 and WO-A-9920720.

The desired fraction(s) may subsequently be isolated for instance by distillation.

Feedstocks typically contain less than 15 ppm of sulphur, preferably less than 8 ppm and more preferably less than 5 ppm, especially less than 1 ppm, as measured according to EN ISO 20846. Typically the feedstocks will comprise no sulphur as being biosourced products.

Before entering the hydrogenation unit, a pre-fractionation step can take place. Having a more narrow boiling range entering the unit allows having a more narrow boiling range at the outlet. Indeed typical boiling ranges of pre-fractionated cuts are 220 to 330° C. while cuts without a pre-fractionating step typically have a boiling range from 150° C. to 360° C.

Hydrogenation Step.

The feedstock issued from HDO/ISO or from syngas is then hydrogenated. The feedstock can optionally be pre-fractionated.

Hydrogen that is used in the hydrogenation unit is typically a high purity hydrogen, e.g. with a purity of more than 99%, albeit other grades can be used.

Hydrogenation takes place in one or more reactors. The reactor can comprise one or more catalytic beds. Catalytic beds are usually fixed beds.

Hydrogenation takes place using a catalyst. Typical hydrogenation catalysts include but are not limited to: nickel, platinum, palladium, rhenium, rhodium, nickel tungstate, nickel molybdenum, molybdenum, cobalt molybdenate, nickel molybdenate on silica and/or alumina carriers or zeolites. A preferred catalyst is Ni-based and is supported on an alumina carrier, having a specific surface area varying between 100 and 200 m²/g of catalyst.

The hydrogenation conditions are typically the following:
Pressure: 50 to 160 bars, preferably 80 to 150 bars, and most preferably 90 to 120 bars or 100 to 150 bars;
Temperature: 80 to 180° C., preferably 120 to 160° C. and most preferably 150 to 160° C.;
Liquid hourly space velocity (LHSV): 0.2 to 5 hr⁻¹, preferably 0.4 to 3, and most preferably 0.5 to 0.8;
Hydrogen treat rate: adapted to the above conditions, which can be up to 200 Nm³/ton of feed.

The temperature in the reactors can be typically about 150-160° C. and the pressure can be typically about 100 bars while the liquid hourly space velocity can be typically about 0.6 h⁻¹ and the treat rate is adapted, depending on the feed quality and the first process parameters.

The hydrogenation process of the invention can be carried out in several stages. There can be two or three stages, preferably three stages, preferably in three separate reactors. The first stage will operate the sulphur trapping, hydrogenation of substantially all unsaturated compounds, and up to about 90% of hydrogenation of aromatics. The flow exiting from the first reactor contains substantially no sulphur. In the second stage the hydrogenation of the aromatics continues, and up to 99% of aromatics are hydrogenated. The third stage is a finishing stage, allowing an aromatic content as low as 100 ppm by weight or even less such as below 50 ppm, more preferably less than 20 ppm, even for high boiling products.

The catalysts can be present in varying or substantially equal amounts in each reactor, e.g. for three reactors according to weight amounts of 0.05-0.5/0.10-0.70/0.25-0.85, preferably 0.07-0.25/0.15-0.35/0.4-0.78 and most preferably 0.10-0.20/0.20-0.32/0.48-0.70.

It is also possible to have one or two hydrogenation reactors instead of three.

It is also possible that the first reactor be made of twin reactors operated alternatively in a swing mode. This may be useful for catalyst charging and discharging: since the first reactor comprises the catalyst that is poisoned first (substantially all the sulphur is trapped in and/or on the catalyst) it should be changed often.

One reactor can be used, in which two, three or more catalytic beds are installed.

It may be necessary to insert quenches on the recycle to cool effluents between the reactors or catalytic beds to control reaction temperatures and consequently hydrothermal equilibrium of the hydrogenation reaction. In a preferred embodiment, there is no such intermediate cooling or quenching.

In case the process makes use of 2 or 3 reactors, the first reactor will act as a sulphur trap. This first reactor will thus trap substantially all the sulphur. The catalyst will thus be saturated very quickly and may be renewed from time to time. When regeneration or rejuvenation is not possible for such saturated catalyst the first reactor is considered as a sacrificial reactor which size and catalyst content both depend on the catalyst renewal frequency.

In an embodiment the resulting product and/or separated gas is/are at least partly recycled to the inlet of the hydrogenation stages. This dilution helps, if this were to be needed, maintaining the exothermicity of the reaction within controlled limits, especially at the first stage. Recycling also allows heat-exchange before the reaction and also a better control of the temperature.

The stream exiting the hydrogenation unit contains the hydrogenated product and hydrogen. Flash separators are used to separate effluents into gas, mainly remaining hydrogen, and liquids, mainly hydrogenated hydrocarbons. The process can be carried out using three flash separators, one of high pressure, one of medium pressure, and one of low pressure, very close to atmospheric pressure.

The hydrogen gas that is collected on top of the flash separators can be recycled to the inlet of the hydrogenation unit or at different levels in the hydrogenation units between the reactors.

Because the final separated product is at about atmospheric pressure, it is possible to feed directly the fractionation stage, which is preferably carried out under vacuum pressure that is at about between 10 to 50 mbars, preferably about 30 mbars.

The fractionation stage can be operated such that various hydrocarbon fluids can be withdrawn simultaneously from the fractionation column, and the boiling range of which can be predetermined.

Therefore, fractionation can take place before hydrogenation, after hydrogenation, or both.

The hydrogenation reactors, the separators and the fractionation unit can thus be connected directly, without having to use intermediate tanks. By adapting the feed, especially the initial and final boiling points of the feed, it is possible to produce directly, without intermediate storage tanks, the final products with the desired initial and final boiling points. Moreover, this integration of hydrogenation and fractionation allows an optimized thermal integration with reduced number of equipment and energy savings.

Fluids Used in the Invention.

The fluids used in the invention, hereafter referred to simply as "the improved fluids" possess outstanding properties, in terms of aniline point or solvency power, molecular weight, vapour pressure, viscosity, defined evaporation conditions for systems where drying is important, and defined surface tension.

The improved fluids are primarily isoparaffinic and contain more than 95% by weight isoparaffins, preferably more than 98% by weight.

The improved fluids typically contain less than 1% by weight of naphthens, preferably less than 500 ppm and advantageously less than 50 ppm.

Typically, the improved fluids comprise carbon atoms number from 6 to 30, preferably 8 to 24 and most preferably from 9 to 20 carbon atoms. The fluids especially comprise a majority, i.e. more than 90% by weight, of molecules with from 14 to 18 carbon atoms as isoparaffins. Preferred improved fluids are those comprising by weight, from 60 to 95%, preferably 80 to 98%, of isoparaffins selected from the group consisting of C15 isoparaffins, C16 isoparaffins, C17 isoparaffins, C18 isoparaffins and mixtures of two or more thereof.

Preferred improved fluids comprise:
C15 isoparaffins and C16 isoparaffins in a combined amount of 80 to 98%; or
C16 isoparaffins, C17 isoparaffins and C18 isoparaffins in a combined amount of 80 to 98%; or
C17 isoparaffins and C18 isoparaffins in a combined amount of 80 to 98%.

Examples of preferred improved fluids are those comprising:
from 30 to 70% of C15 isoparaffins and from 30 to 70% C16 isoparaffins, preferably from 40 to 60% of 015 isoparaffins and from 35 to 55% C16 isoparaffins;
from 5 to 25% of C15 isoparaffins, from 30 to 70% C16 isoparaffins and from 10 to 40% of C17 isoparaffins, preferably from 8 to 15% of 015 isoparaffins, from 40 to 60% C16 isoparaffins and from 15 to 25% of C17 isoparaffins;
from 5 to 30% of C17 isoparaffins and from 70 to 95% 018 isoparaffins, preferably from 10 to 25% of C17 isoparaffins and from 70 to 90% C18 isoparaffins.

The improved fluids exhibit a specific branching distribution.

Branching rates of isoparaffins as well as carbon distribution is determined using the NMR method (as well as GC-MS) and determination of each type of carbon (with no hydrogen, with one, two or three hydrogens). C quat sat represents the saturated quaternary carbon, CH sat represents the saturated carbon with one hydrogen, $CH_2$ sat represents the saturated carbon with two hydrogens, $CH_3$ sat represents the saturated carbon with three hydrogens, $CH_3$ long chain and $CH_3$ short chain represent the $CH_3$ group on a long chain and a short chain, respectively where the short chain is one methyl group only and a long chain is a chain having at least two carbons. The sum of $CH_3$ long chain and $CH_3$ short chain is $CH_3$ sat.

The improved fluids typically comprise carbon expressed as Cquat less than 3%, preferably less than 1% and more preferably about 0%.

The improved fluids typically comprise carbon expressed as CH sat less than 20%, preferably less than 18% and more preferably less than 15%.

The improved fluids typically comprise carbon expressed as $CH_2$ sat more than 40%, preferably more than 50% and more preferably more than 60%.

The improved fluids typically comprise carbon expressed as $CH_3$ sat less than 30%, preferably less than 28% and more preferably less than 25%.

The improved fluids typically comprise carbon expressed as $CH_3$ long chain less than 20%, preferably less than 18% and more preferably less than 15%.

The improved fluids typically comprise carbon expressed as $CH_3$ short chain less than 15%, preferably less than 10% and more preferably less than 9%.

The improved fluids have a boiling point in the range of from 200 to 400° C. and also exhibit an enhanced safety, due to the very low aromatics content.

The improved fluids typically contain less than 100 ppm, more preferably less than 50 ppm, advantageously less than 20 ppm aromatics (measured using a UV method). This is especially useful for high temperature boiling products, typically products having a boiling point in the range 300-400° C., preferably 320-380° C.

The boiling range of the improved fluids is preferably not more than 80° C., preferably not more than 70° C., more preferably not more than 60° C., even more preferably between 35 and 50° C. and advantageously between 40 and 50° C.

The improved fluids also have an extremely low sulphur content, typically less than 5 ppm, even less than 3 ppm and preferably less than 0.5 ppm, at a level too low to be detected by the usual low-sulphur analyzers.

The Initial Boiling Point (IBP) to Final Boiling Point (FBP) range is selected according to the particular use and composition. An Initial Boiling Point of more than 250° C. allows classification as free of VOC (Volatile Organic Compounds) according to the directive 2004/42/CE.

Biodegradation of an organic chemical refers to the reduction in complexity of the chemical through metabolic activity of microorganisms. Under aerobic conditions, microorganisms convert organic substances into carbon dioxide, water and biomass. OECD 306 method, is available for assessing biodegradability of individual substances in seawater. OECD Method 306 can be carried out as either a shake flask or Closed Bottle method and the only microorganisms added are those microorganisms in the test seawater to which the test substance is added. In order to assess the biotic degradation in seawater, a biodegradability test was performed which allows the biodegradability to be measured in seawater. The biodegradability was determined in the Closed Bottle test performed according to the OECD 306 Test Guidelines. The biodegradability of the improved fluids is measured according to the OECD Method 306.

The OECD Method 306 is the following:

The closed bottle method consists on dissolution of a pre-determined amount of the test substance in the test medium in a concentration of usually 2-10 mg/l, with one or more concentrations being optionally used. The solution is kept in a filled closed bottle in the dark in a constant temperature bath or enclosure controlled within a range of 15-20° C. The degradation is followed by oxygen analyses over a 28-day period. Twenty-four bottles are used (8 for test substance, 8 for reference compound and 8 for sweater plus nutriment). All analyses are performed on duplicate bottles. Four determinations of dissolved oxygen, at least, are performed (day 0, 5, 15 and 28) using a chemical or electrochemical method.

Results are thus expressed in % degradability at 28 days. The improved fluids have a biodegradability at 28 days of at least 60%, as measured according to the OECD 306 standard, preferably at least 70% by weight, more preferably at least 75% and advantageously at least 80%.

The invention uses the products of natural origin like starting products. The carbon of a biomaterial comes from the photosynthesis of the plants and thus of atmospheric $CO_2$. The degradation (by degradation, one will understand also combustion/incineration at the end of the lifetime) of these CO2 materials thus does not contribute to the warming since there is no increase in the carbon emitted in the atmosphere. The assessment $CO_2$ of the biomaterials is thus definitely better and contributes to reduce the print carbon of the products obtained (only energy for manufacture is to be taken into account). On the contrary, a fossil material of origin being also degraded out of $CO_2$ will contribute to the increase in the $CO_2$ rate and thus to climate warming. The improved fluids according to the invention will thus have a print carbon which will be better than that of compounds obtained starting from a fossil source.

The invention thus improves also the ecological assessment during the manufacture of the improved fluids. The term of "bio-carbon" indicates that carbon is of natural origin and comes from a biomaterial, as indicated hereafter. The content of biocarbon and the content of biomaterial are expressions indicating the same value.

A renewable material of origin or biomaterial is an organic material in which carbon comes from $CO_2$ fixed recently (on a human scale) by photosynthesis starting from the atmosphere. On ground, this $CO_2$ is collected or fixed by the plants. At sea, $CO_2$ is collected or fixed by microscopic bacteria or plants or algae carrying out a photosynthesis. A biomaterial (carbon natural origin 100%) presents an isotopic ratio $^{14}C/^{12}C$ higher than $10^{-12}$, typically about $1.2 \times 10^{-12}$, while a fossil material has a null ratio. Indeed, the isotope $^{14}C$ is formed in the atmosphere and is then integrated by photosynthesis, according to a scale of time of a few tens of years at the maximum. The half-life of $^{14}C$ is 5730 years. Thus the materials resulting from photosynthesis, namely the plants in a general way, have necessarily a maximum content of isotope $^{14}C$.

The determination of the content of biomaterial or content of biocarbon is given pursuant to standards ASTM D 6866-12, method B (ASTM D 6866-06) and ASTM D 7026 (ASTM D 7026-04). Standard ASTM D 6866 concerns "Determining the Biobased Content of Natural Range Materials Using Radiocarbon and Isotope Ratio Mass Spectrometry Analysis", while standard ASTM D 7026 concerns "Sampling and Reporting of Results for Determination of Biobased Content of Materials via Carbon Isotope Analysis". The second standard mentions the first in its first paragraph.

The first standard describes a test of measurement of the ratio $mC/^{12}C$ of a sample and compares it with the ratio $^{14}C/^{12}C$ of a sample renewable reference of origin 100%, to give a relative percentage of C of origin renewable in the sample. The standard is based on the same concepts that the dating with $^{14}C$, but without making application of the equations of dating. The ratio thus calculated is indicated as the "pMC" (percent Modem Carbon). If the material to be analyzed is a mixture of biomaterial and fossil material (without radioactive isotope), then the value of pMC obtained is directly correlated with the quantity of biomaterial present in the sample. The value of reference used for the dating to $^{14}C$ is a value dating from the years 1950. This year was selected because of the existence of nuclear tests in the atmosphere which introduced great quantities of isotopes into the atmosphere after this date. The reference 1950 corresponds to a value pMC of 100. Taking into account the thermonuclear tests, the current value to be retained is approximately 107.5 (what corresponds to a factor of correction of 0.93). The signature into radioactive carbon of a current plant is thus of 107.5. A signature of 54 pMC and 99 pMC thus correspond to a quantity of biomaterial in the sample of 50% and 93%, respectively.

The compounds according to the invention come at least partly from biomaterial and thus present a content of biomaterial from at least 95%. This content is advantageously even higher, in particular more than 98%, more preferably more than 99% and advantageously about 100%. The compounds according to the invention can thus be bio-carbon of 100% biosourced or on the contrary to result from a mixture with a fossil origin. According to an embodiment, the isotopic ratio $^{14}C/^{12}C$ is between 1.15 and $1.2 \times 10^{-12}$.

According to an embodiment, the fluid has a flash point higher than 100° C., preferably higher than 105° C., preferentially higher than 110° C., more preferentially higher than 115° C.

All percentages and ppm are by weight unless indicated to the contrary. Singular and plural are used interchangeably to designate the fluid(s).

The following example illustrates the invention without limiting it.

EXAMPLE

A feedstock being a NEXBTL feedstock (isoalkane) is used in the process of the invention. The following conditions for hydrogenation are used:

The temperature in the reactors is about 150-160° C.; the pressure is about 100 bars and the liquid hourly space velocity is $0.6~h^{-1}$; the treat rate is adapted. The catalyst used is nickel on alumina.

Fractionating is carried out to provide 3 fluids to be used in the invention.

The resulting products have been obtained, with the following properties.

The following standards have been used to determine the following properties:

| Flash point | EN ISO 2719 |
|---|---|
| Pour point | EN ISO 3016 |
| Density at 15° C. | EN ISO 1185 |
| Viscosity at 40° C. | EN ISO 3104 |
| Aniline point | EN ISO 2977 |
| Thermal conductivity[1] | Internal Flash method |
| Specific heat[2] | Method by calorimetry |

1. A specific apparatus is used, comprising two tubes of aluminium, one inner and one outer. The fluid to be measured is placed in the annular space between the two tubes. An energy pulse (dirac type) is applied on the inner tube and the temperature is measured on the outer tube, whereby a thermogram is obtained.

Knowing the thermal diffusivity, density and specific heat of two layers of the two tubes of aluminium as a function of temperature, and knowing the density and specific heat of the fluid to be analysed, one can deduce the thermal conductivity of the fluid as a function of temperature.

Calibration of the Apparatus.

The apparatus is first calibrated with a reference sample, SERIOLA 1510 (heat transfer medium) at different temperatures. The different thermal properties were measured separately before.

Sample Preparation.

The sample is mixed and introduced (using syringe) into the annular space between the two tubes. The loaded apparatus is then placed in a chamber regulated in temperature.

Measurement Protocol.

For each temperature measurement, the following procedure is followed. The sample is stabilized at a given temperature. Then light flashes are applied on the inner face of the inner tube and the rise in temperature of the outer face of the outer tube is recorded over time.

Based on average values obtained with at least 3 measures at each given temperature, the thermal conductivity is calculated.

2. The specific heat is measured using a DSC calorimeter (DSC NETZSCH 204 Phoenix), which is compliant with standards ISO 113587, ASTM E1269, ASTM E968, ASTM E793, ASTM D3895, ASTM D3417, ASTM D3418, DIN 51004, DIN 51007 and DIN 53765.

| Characteristic | Ex. 1 | Ex. 2 | Ex. 3 |
|---|---|---|---|
| Aromatic content (ppm) | <20 | <20 | <20 |
| Sulfur content (ppm) | 0.1 | 0.1 | 0.11 |
| % isoparaffins (w/w) | 98.9 | 95.1 | 96.2 |
| % n-paraffins (w/w) | 1.1 | 4.9 | 3.8 |
| % naphthenic (w/w) | 0 | 0 | 0 |
| C15 (iso) | 48.35 | 11.45 | 0 |
| C16 (iso) | 42.80 | 47.89 | 1.58 |
| C17 (iso) | 2.52 | 18.57 | 14.17 |
| C18 (iso) | 0.38 | 17.07 | 79.69 |
| C quat sat | 0 | 0 | 0 |
| CH sat | 12.1 | 10.9 | 10.2 |
| $CH_2$ sat | 64.9 | 67.8 | 70.7 |
| $CH_3$ sat | 22.9 | 21.2 | 19.1 |
| $CH_3$ long chain | 14.2 | 13.3 | 12 |
| $CH_3$ short chain | 8.7 | 8 | 7.1 |
| Biocarbon content (%) | 97 | 97 | 98 |
| Initial Boiling Point (° C.) | 247.0 | 259.5 | 293.6 |
| 5% point (° C.) | 255.7 | 270.2 | 296.7 |
| 50% point (° C.) | 258.9 | 274.5 | 298.5 |
| 95% point (° C.) | 266.8 | 286.4 | 305.3 |
| Dry point (° C.) | 269.0 | 287.5 | 324.1 |
| OECD biodegradability (28 days) (%) | 80 | 83 | 83 |
| Flash point (° C.) | 115 | 125 | 149.5 |
| Density at 15° C. (kg/m3) | 776.4 | 780.3 | 787.2 |
| Viscosity at 40° C. ($mm^2$/s) | 2.495 | 2.944 | 3.870 |
| Pour point (° C.) | −81 | −60 | −45 |
| Aniline point (° C.) | 93.2 | 95.7 | 99.5 |
| Thermal conductivity Lambda (at ° C. in W/(m · K)) | 28/0.130 73/0.125 128/0.124 | 27/0.135 73/0.128 127/0.126 | 23/0.138 88/0.137 158/0.127 |
| Specific heat (at ° C. in J/(kg · K)) | 30.3/2154 74.8/2336 129.2/2540 | 31.3/2202 74.8/2324 129.2/2503 | 31.3/2185 89.7/2377 158.9/2695 |

The three fluids also are colorless, odorless, have a purity according to the European Pharmacopoeia suitable for food grade application, and are solvent class A according to CEN/TS 16766.

These results show that the improved fluids described in the invention are especially useful for use as heat transfer media.

The thermal conductivity values are indicative of a conductivity that is superior to the one of standard mineral oils, at the same viscosity (by up to 7%), the heat transfer rate is improved. The specific heat is superior to the one of standard mineral oils (by up to 11%).

The results also show that it is possible to obtain heat transfer media having kinematic viscosity higher than 3, especially from 3 to 6 mm²/s, good heat capacity and a wide temperature range of operation.

The fluids of the invention will thus find applications in a number of applications, especially those involving a closed loop system, preferably non-pressurized. The fluids may also find applications in pressurized (low to medium) closed loop systems as well in open loop systems.

The thermal stability has been evaluated in the present invention by measuring, according to the GB/T 23800-2009 standard, the percentage of decomposition of the fluid. The test performed in the present example differs from the standard by the temperature and the duration of the test. According to the example, the percentage of decomposition of the fluid has been measured after 500 hours at 320° C.

The fluid of Ex. 3 according to the invention and defined above has been compared with other commercial fluids: an alkylbenzene fluid, a dibenzyltoluene isomer, a mineral base oil and a hydrotreated mineral base oil.

Thermal stability results are given in table 2 below.

TABLE 2 thermal stability results

| | Ex. 3 | Alkylbenzene | Dibenzyltoluene isomer | Mineral base oil | Hydrotreated mineral base oil |
|---|---|---|---|---|---|
| Thermal stability (% of decomposition) | 1.6 | 9.9 | 6.9 | 26 | 5.8 |

The fluid defined in the present invention has a much better thermal stability than comparative fluids of the prior art, with less than 2% of decomposition after 500 hours at 320° C.

The invention claimed is:

1. Method for transferring heat, said method comprising:
   introducing a liquid fluid into a closed loop system, the fluid having an initial boiling point and a final boiling point in the range of from 200° C. to 400° C. and a boiling range below 80° C., said fluid comprising more than 95% by weight of isoparaffins, less than 3% by weight of naphthenes, a biocarbon content of at least 95% by weight, and less than 100 ppm by weight aromatics; and
   transferring heat by the fluid in a car engine,
   wherein the step of transferring heat comprises a step of cooling the car engine,
   wherein the boiling range of the fluid is 240° C.-275° C. or 250° C.-295° C. or 285° C.-335° C. wherein the fluid has a flash point higher than 115° C.

2. Method of claim 1, wherein the step of transferring heat is performed at a temperature ranging from −50° C. to 260° C.

3. Method of claim 2, wherein the fluid in the step of transferring heat has a boiling range of 240° C.-275° C. or a boiling range of 250° C.-295° C.

4. Method of claim 1, wherein the step of transferring heat is performed at a temperature ranging from −30° C. to 315° C.

5. Method of claim 4, wherein the fluid in the step of transferring heat has a boiling range of 285° C.-335° C.

6. Method of claim 1, wherein the fluid contains less than 50 ppm aromatics.

7. Method of claim 1, wherein the fluid contains less than 1% by weight of naphthenes.

8. Method of claim 1, wherein the fluid further contains less than 5 ppm sulphur.

9. Method of claim 1, wherein the fluid has a biodegradability at 28 days of at least 60%, as measured according to the OECD 306 standard.

10. Method of claim 1, wherein the fluid contains less than 20 ppm by weight of aromatics and less than 500 ppm by weight of naphthenes and wherein the fluid has an initial boiling point and a final boiling point in the range of from 240° C. to 340° C.

11. Method of claim 1, wherein the closed-loop system is a non-pressurized closed-loop system.

12. The method of claim 1, wherein the fluid further comprises less than 4% by weight of n-paraffins.

13. Method for transferring heat, said method comprising:
   introducing a liquid fluid into a closed-loop system, the fluid having an initial boiling point and a final boiling point in the range of from 200° C. to 400° C. and a boiling range below 80° C., said fluid comprising at least 95.1% by weight of isoparaffins, less than 3% by weight of naphthenes, a biocarbon content of at least 95% by weight, and less than 50 ppm by weight aromatics,
   transferring heat by the fluid in a car engine,
   wherein the step of transferring heat comprises a step of cooling the car engine,
   wherein the step of transferring heat is operated at a temperature ranging from −50° C. to 260° C. and wherein the fluid has a boiling range of 240° C.-275° C. or a boiling range of 250° C.-295° C. wherein the fluid has a flash point higher than 115° C.

14. The method of claim 13, wherein the fluid further comprises less than 4% by weight of n-paraffins.

15. Method for transferring heat, said method comprising:
   introducing a liquid fluid into a closed-loop system, the fluid having an initial boiling point and a final boiling point in the range of from 200° C. to 400° C. and a boiling range below 80° C. said fluid comprising at least 95.1% by weight of isoparaffins, less than 1% by weight of naphthenes, a biocarbon content of at least 95% by weight, and less than 50 ppm by weight aromatics,
   transferring heat by the fluid in a car engine,
   wherein the step of transferring heat comprises a step of cooling the car engine,
   wherein the step of transferring heat is operated at a temperature ranging from −30° C. to 315° C. and wherein the fluid has a boiling range of 285° C.-335° C. wherein the fluid has a flash point higher than 115° C.

16. The method of claim 15, wherein the fluid further comprises less than 4% by weight of n-paraffins.

* * * * *